(12) United States Patent
Smith

(10) Patent No.: US 6,309,027 B1
(45) Date of Patent: *Oct. 30, 2001

(54) WHEEL COVERS

(76) Inventor: John D. Smith, 524 W. Winter Park St., Orlando, FL (US) 32804

( * ) Notice: Subject to any disclaimer, the term of this patent is extended or adjusted under 35 U.S.C. 154(b) by 0 days.

This patent is subject to a terminal disclaimer.

(21) Appl. No.: 09/627,835

(22) Filed: Jul. 28, 2000

(51) Int. Cl.$^7$ ..................................................... B60B 7/00
(52) U.S. Cl. .......................... 301/37.1; 301/37.42; 40/587
(58) Field of Search ........................... 301/31.28, 37.1, 301/37.42, 37.31, 37.34, 37.41, 37.25, 37.26, 108.1, 108.3; 24/442, 575, 580; 40/587

(56) References Cited

U.S. PATENT DOCUMENTS

| | | |
|---|---|---|
| D. 105,054 | 6/1937 | Ficks . |
| D. 170,114 | 8/1953 | Dieterich ................. D14/30 |
| D. 370,198 | 5/1996 | Starr, Sr. et al. ............... D12/213 |
| D. 438,835 * | 3/2001 | Maschino ................. D12/213 |
| 1,406,945 | 2/1922 | Dunlap et al. . |
| 1,446,561 | 2/1923 | Harris . |
| 1,952,708 | 3/1934 | Gruenberg ..................... 46/48 |
| 2,124,789 | 7/1938 | Lyon ............................. 301/37 |
| 2,279,704 | 4/1942 | Davenport ........................ 41/10 |
| 2,548,070 | 4/1951 | Ryan ............................. 40/129 |
| 2,558,423 | 6/1951 | Dobrosky ......................... 41/34 |
| 2,621,081 | 12/1952 | Mann ............................. 301/37 |
| 3,397,918 | 8/1968 | Aske, Jr. et al. ................. 301/37 |
| 3,847,443 | 11/1974 | Laurion ......................... 301/37 R |
| 3,854,448 * | 12/1974 | Kromanakar ..................... 301/37.42 |
| 3,900,652 | 8/1975 | Uraya et al. ..................... 428/92 |
| 4,344,654 | 8/1982 | Apezynski ..................... 301/37 R |
| 4,431,196 | 2/1984 | Kutnyak ......................... 273/424 |
| 4,792,191 * | 12/1988 | Farmer ........................... 301/37.1 |
| 4,874,206 * | 10/1989 | Sampson ......................... 301/37.42 |
| 4,955,113 | 9/1990 | Rajala et al. ..................... 24/448 |
| 4,955,670 | 9/1990 | Koller ............................. 301/37 R |
| 5,077,870 | 1/1992 | Melbye et al. ..................... 24/452 |
| 5,131,727 | 7/1992 | Johnson ......................... 301/37 R |
| 5,212,853 | 5/1993 | Kaneko ........................... 24/452 |
| 5,263,770 * | 11/1993 | Goudey ........................... 301/37.37 |
| 5,316,376 | 5/1994 | Defreitas ......................... 301/37.26 |
| 5,319,531 | 6/1994 | Kuntyak ......................... 362/184 |
| 5,423,599 * | 6/1995 | Sherod et al. ..................... 301/37.1 |
| 5,435,630 * | 7/1995 | Tucker ........................... 301/37.1 |
| 5,457,886 | 10/1995 | Fuller ............................. 29/894.381 |
| 5,524,972 * | 6/1996 | Cailor et al. ..................... 301/37.42 |
| 5,839,796 * | 11/1998 | Ichikawa et al. ................. 301/37.31 |
| 5,873,637 * | 2/1999 | Ichikawa ......................... 301/37.34 |
| 5,884,981 * | 3/1999 | Ichikawa ......................... 301/37.34 |
| 5,931,543 | 8/1999 | Smith ............................. 301/37.28 |
| 6,030,050 * | 2/2000 | Ichikawa et al. ................. 301/37.42 |

* cited by examiner

Primary Examiner—S. Joseph Morano
Assistant Examiner—Long Bae Nguyen
(74) Attorney, Agent, or Firm—Brian S. Steinberger; Law Offices of Brian S. Steinberger, P.A.

(57) ABSTRACT

Removable decorative wheel covers for covering central wheel portions on wheels on various types of moving vehicles from automobiles to buses to trucks. The covers have perforated patterns of circles, rectangles, and the like, that can be punched out as needed to allow different sized wheel protrusions such as valve stems, central raised hub members, and the like to pass therethrough. The perforations can include a single closed pattern that allows a single opening to be created. Additionally, the perforations can be in a ring pattern about the outer perimeter of the disc. Still furthermore, the perforations can be in a central region of the disc. Still furthermore, the openings can be punched out to allow components on the wheel that heat up such as brakes, and the like, to be air cooled. The placement of the perforations does not overlap the areas of the design type indicia that can be placed on the external surface of the wheel cover.

21 Claims, 8 Drawing Sheets

Back of disk

Airstem Hole Perforated

610

620

635

630

WHEEL COVERS

This invention relates to wheel covers, and in particular to detachable decorative wheel covers that can fit over different types of vehicle wheels where the covers have removable portions that allow protrusions such as air valve stems, and center raised hubs to pass therethrough. The invention is related to U.S. Pat. No. 5,931,543 to Smith, the same inventor of the subject invention, which is incorporated by reference.

BACKGROUND AND PRIOR ART

Wheel covers for vehicles such as automobiles and trucks have generally been restricted to plastic and metal type hubcaps having bendable insertable edges for covering and protecting wheel hubs. See for example: U.S. Patents Des. 170,114 to Dieterich; Des. 370,198 to Starr, Sr. et al.; 2,124,789 to Lyon; 2,279,704 to Davenport; and 5,457,886 to Fuller. While these patents show some decorative exteriors, all of the exterior shapes and forms require engraving onto the metal hubcap itself so that the hubcap becomes a permanent fixture on the vehicle's wheels, and do not allow for having removable openings for allowing raised members such as valve stems and raised wheel portions to pass therethrough.

Other types of hub caps and trim covers have also been used over the years, and have included an opening for valve stems. See for example, U.S. Pat. No. 1,406,945 to Dunlap et al.; U.S. Pat. No. 1,446,561 to Harris; U.S. Pat. No. 3,397,918 to Aske, Jr. et al; and U.S. Pat. No. 4,344,654 to Apezynski. However, each of these devices is restricted to having a single fixed opening location for the valve stem and do not allow for passing different sized valve stems at different locations therethrough, nor for allowing for other raised wheel protrusions such as a raised hub member to pass therethrough.

Some types of external removable covers have been proposed for vehicle wheels. See for example: U.S. Pat. No. 4,792,191 to Farmer and U.S. Pat. No. 4,955,670 to Koller. However, both of these patents are temporarily shields that are primarily used when the vehicle is stationary and allow the tires and cars to be cleaned and detailed. The Farmer '191 patent has a some small holes about a central portion of their cover but they are only used as finger holes for physically holding the cover, and not for allowing fixed protrusions such as valve stems or other raised wheel members to be able to protrude therethrough. Likewise, Koller has a central through-hole that is only used for holding the cover, and not for allowing fixed protrusions such as valve stems or other raised wheel members to protrude therethrough. Furthermore, these devices cannot be used when the vehicle is in motion.

Other types of removable covers have been proposed as decorative wheel covers. See for example: U.S. Pat. No. 2,548,070 to Ryan and U.S. Pat. No. 5,316,376 to Defreitas. However, none of these references allow for openings that would allow raised wheel protrusions such as valve stems and raised wheel members to pass therethrough.

The above devices referenced in the patents could also be dangerous in some wheel applications where internal wheel components such as brakes on many large vehicles such as buses, and trucks need to have air flow about the wheels in order to constantly air cooled. The above devices described in the patents by covering up most of the outside surface of the wheel hub areas inside of the tires could result in overheating components such as brakes in some types of vehicles.

None of the prior art patents has portions of the wheel cover that can be removed as desired for allowing various raised portions of the wheel such as different sized valve stems, raised wheel hub type members, and the like, to be able to pass therethrough. Also, none of the prior art addresses the problems of restricting the air flow to wheel brakes, by allowing the user to selectively punch out portions of the wheel cover as needed.

SUMMARY OF THE INVENTION

A primary objective of the invention is to provide a decorative wheel cover for moving vehicles having at least one perforated portion that can be selectively removed by the user.

A secondary objective of the invention is to provide a decorative wheel cover for moving vehicles having different areas that can be removed to allow for raised protrusions on the wheel such as different sized air valve stems, raised center hubs, and the like, to pass therethrough.

A third objective of the invention is to provide a decorative wheel cover for moving vehicles having at least one portion that can be removed for allowing internal wheel components such as brakes to be cooled as needed.

A preferred version of the removable decorative wheel cover for covering wheel hubs on moving vehicles includes a thin rigid and pliable plastic disc for substantially covering an existing wheel hub of a vehicle. The novel discs can each have a diameter of approximately 13 inches to approximately 18 inches for vehicles such as cars and pickups, and approximately 18 to approximately 36 inches for large vehicles such as tractor trailers, semis, and the like The disc can have a thickness of approximately $1/32$ of an inch to approximately $1/2$ of an inch. A continuous closed line of perforations in the disc allows a user to remove a small portion of material from the disc to form a through-hole therein. The decorative design/indicia on the cover does not overlap into the area bounded by the line of perforations. Fasteners such as hook and loop fasteners, snaps, and peel and stick tape allow the disc to removably attached to the existing wheel hub of the vehicle as needed.

The continuous closed line of perforations form perforated patterns of different shapes such as substantially rectangular shape, a substantially circular shape, other shapes, and the like.

Users can selectively punch out one or more of the perforated patterns to create through-hole(s) in order to allow different sized raised protrusions on the wheel such as a valve stem, and a center raised hub member to pass therethrough. Additionally, through-holes can be selectively punched out to allow components that generate heat such as breaks to be air cooled by the through-hole opening(s).

The continuous lines of perforations can form a ring of individual perforated closed patterns adjacent to an outer perimeter of the disc, wherein individual openings can be spaced approximately $1/4$ of an inch to approximately 2 inches from the perimeter of the disc. The ring can include approximately 4 to approximately 8 individual perforated closed patterns. Using 4 to 6 closed patterns would allow each of the openings to have individual diameters of approximately 1 to approximately 2 inches. Using approximately 7 to approximately 8 individual perforated closed patterns would allow each of the openings to have individual diameters of approximately $1/2$ to approximately 1 inch. The ring can include individual openings having non uniform diameters so that wheels having larger valve stems can be used with the disc.

The disc can also include a substantially central located closed pattern of perforations within the ring, which has a diameter of approximately 2 to approximately 4 inches.

Further objects and advantages of this invention will be apparent from the following detailed description of a presently preferred embodiment which is illustrated schematically in the accompanying drawings.

DESCRIPTION OF THE PREFERRED EMBODIMENT

Before explaining the disclosed embodiment of the present invention in detail it is to be understood that the invention is not limited in its application to the details of the particular arrangement shown since the invention is capable of other embodiments. Also, the terminology used herein is for the purpose of description and not of limitation.

Figure 1B:
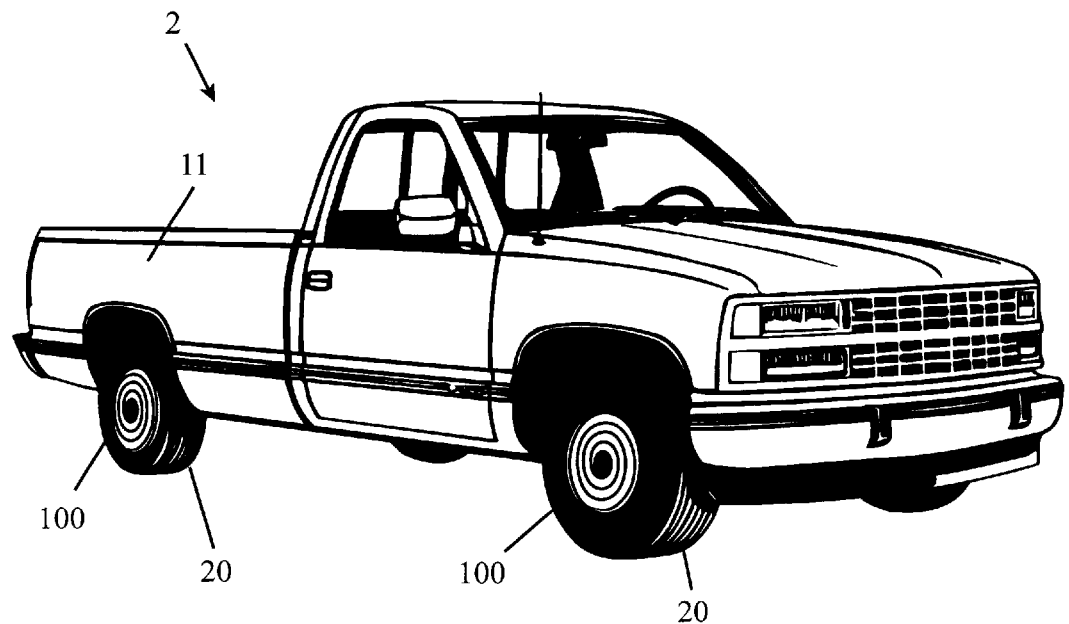
FIG. 1B shows the novel wheels of FIG. 1A on a truck.
Figure 1A:
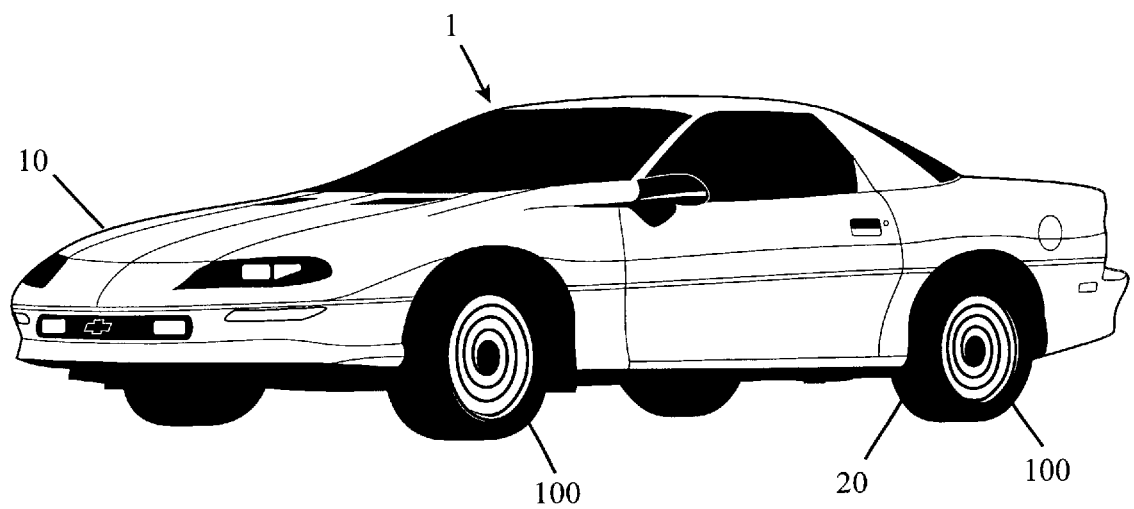
FIG. 1A shows a preferred embodiment of the novel wheel covers on the wheels of an automobile.
Figure 2:
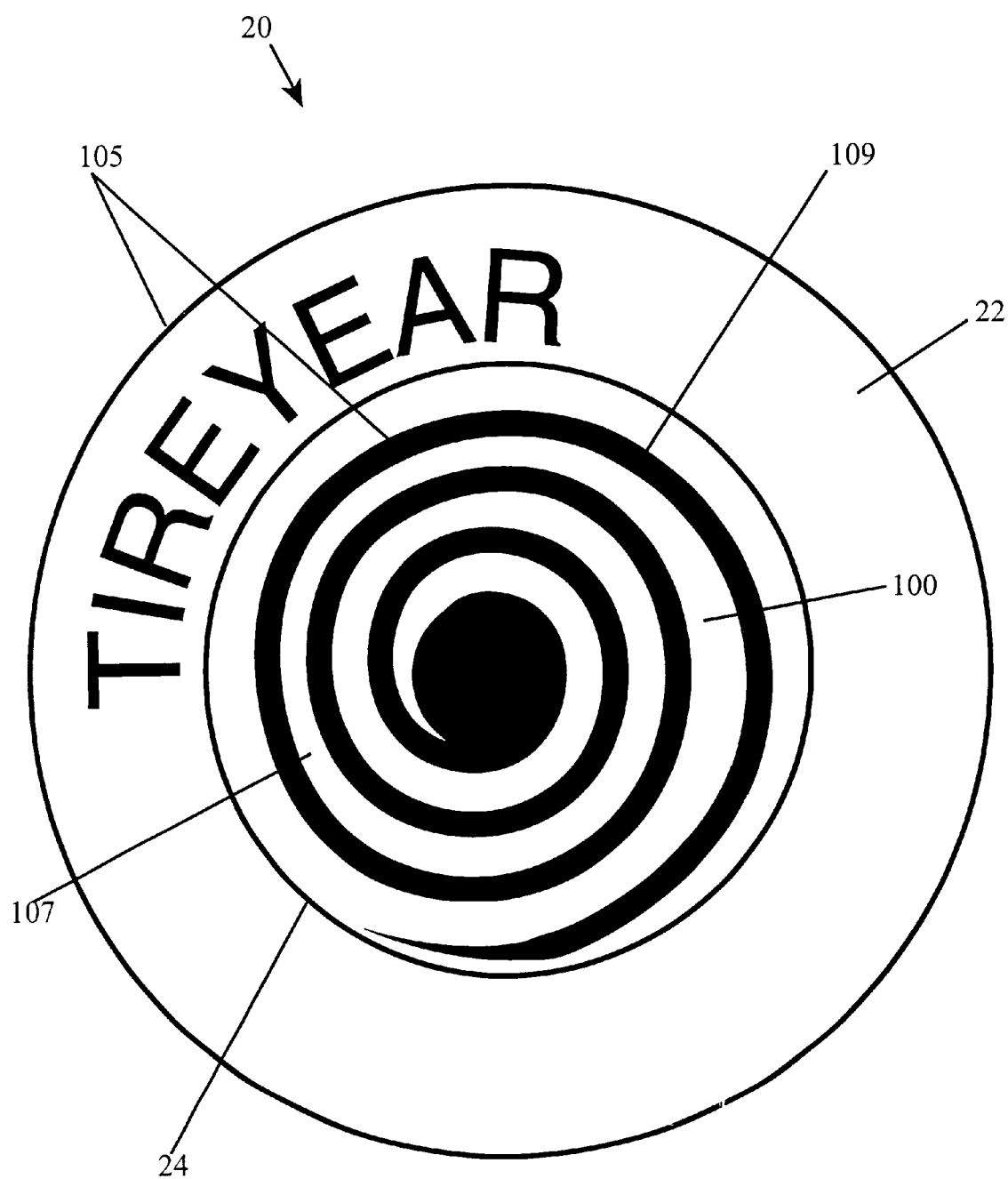
FIG. 2 is an enlarged view of a wheel cover of FIG. 1A–1B, with a spiral design.

FIG. 1A shows a preferred embodiment 1 of the novel wheel covers 100, 100' on the wheels 20, 20' of an automobile 10. FIG. 1B shows the novel wheels 100, 100' of FIG. 1A on the wheels 20, 20' of a truck. FIG. 2 is an enlarged view of a wheel cover of FIGS. 1A–1B, with a spiral design 105, 107.

Referring to FIGS. 1A, 1B and 2, disc cover 100 can be approximately 13 inches to approximately 18 and ½ inches in diameter to fit over most wheel hubs 24. Other diameter sizes of approximately 18 to approximately 36 inches can be used to provide covers for other sized wheels, such as but not limited to tractor trailers, semis, and the like. Preferably disc cover 100 can have a thickness of approximately 1 mill(1/32 of an inch) to approximately 16 mills(½of an inch). Pliable material used for the disc cover 100 can include but is not limited to PVC(poly vinyl carbonate), such as Sintra® manufactured by Alucobond Co. Generally, Sintra® is available in the colors of white, red yellow, blue and green. Other types of material that can be used include clear plastics, such as poly carbonate, such as one manufactured by Sheffield Plastics. Designs and/or indicia can be applied to the outer surface of the plastic by being screen printed, and by techniques described in U.S. Pat. No. 5,931,543 to Smith, which is incorporated by reference.

Figure 3:
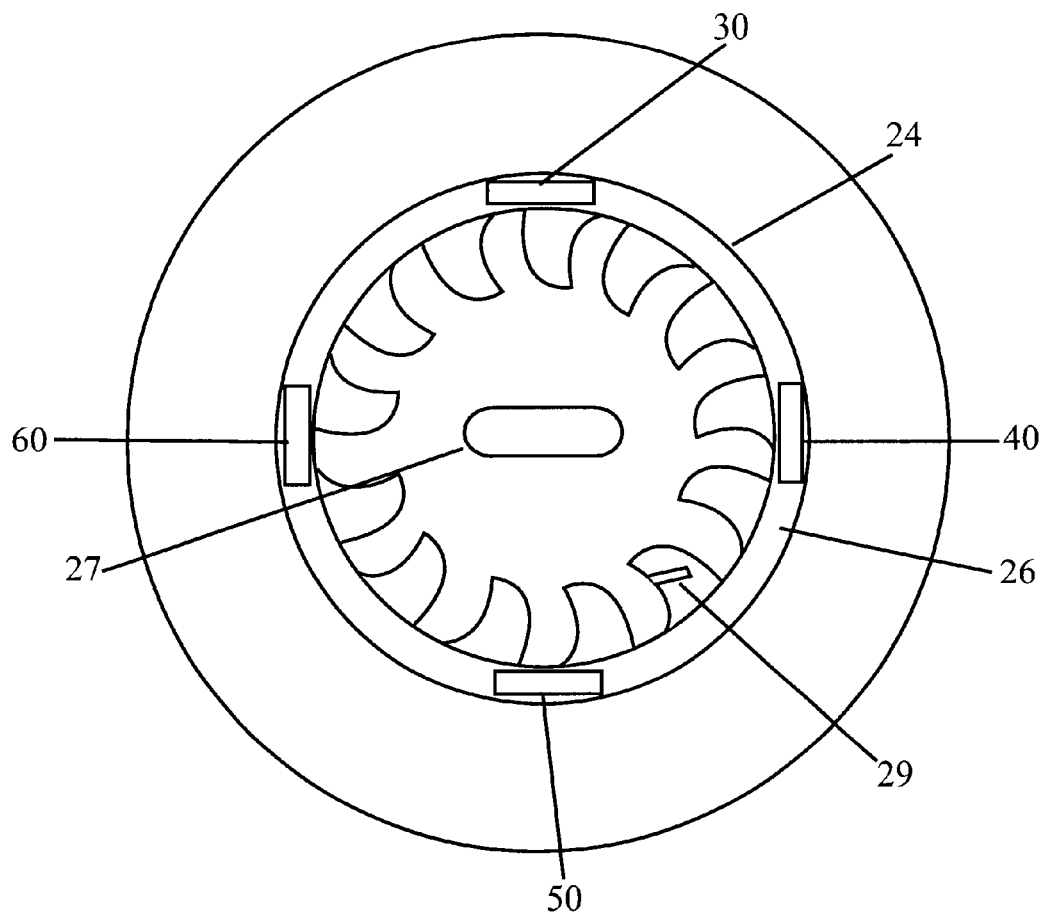
FIG. 3 is a front view of an existing exposed vehicle wheel hub of the preceding figures having strip fasteners attached thereto without a hubcap.
Figure 4:
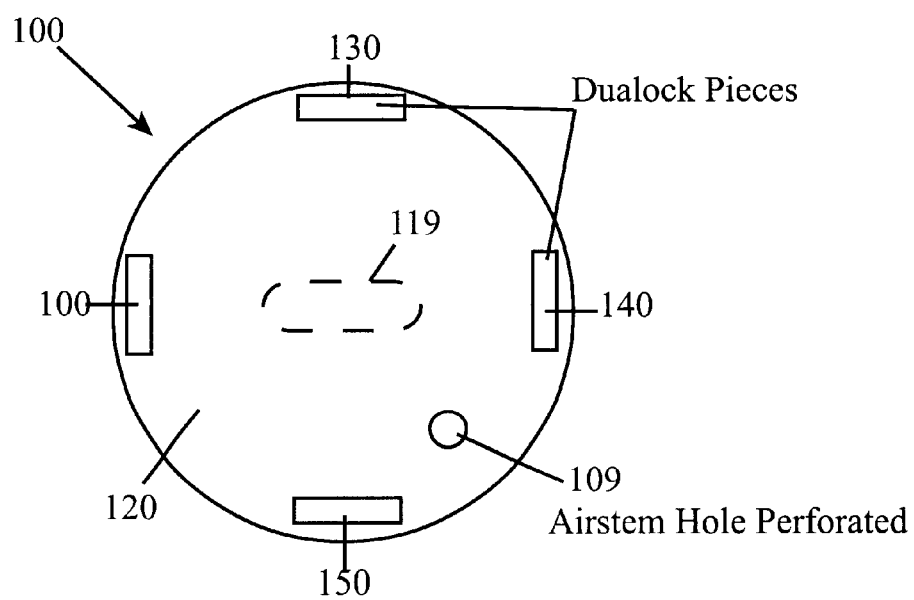
FIG. 4 is a rear view of the novel wheel cover of the preceding figures showing the matching strip fasteners.

FIG. 3 is a front view of an existing exposed vehicle wheel hub 24 of FIG. 2 with outer ring 26 and raised air stem valve 29, and raised center hub member 27, and first strip fasteners 30, 40, 50, 60. FIG. 4 shows the back of the novel disc 100 of the subject invention. On most conventional vehicles such as automobiles, the outer flat ring portion 26 is approximately ¼ to approximately ½ inches wide. Note that the novel wheel covers 100 of the subject invention are mounted in place of a hubcap which are used to generally cover the wheel hubs. The invention can be mounted on the wheel hubs that have their hubcaps removed or alternatively on wheel hubs that do not have hubcaps. Still furthermore, the novel wheel covers 100 can be directly mounted over the hubcaps. A perforated pattern 109 in the shape of a circle, oval, and the like, adjacent to the outer edge of the disc 120, is for the raised airstem valve 29 of the wheel 20. A perforated pattern 119 in the shape of a oval, rectangle, and the like, that is substantially located in the center of the disc 120, can be punched out for the raised center hub 27 of the wheel 20. The strips 130, 140, 150 and 160 in FIG. 4 can be matching hook and loop fasteners for the hook and loop fastener strips 30, 40, 50 and 60 on the rim 26 shown in FIG. 3. Alternatively, strong peel and stick tape, such as but not limited to UHB tape by 3-M® can be used for these fasteners in order to removably hold the disc to the wheel.

Figure 5:
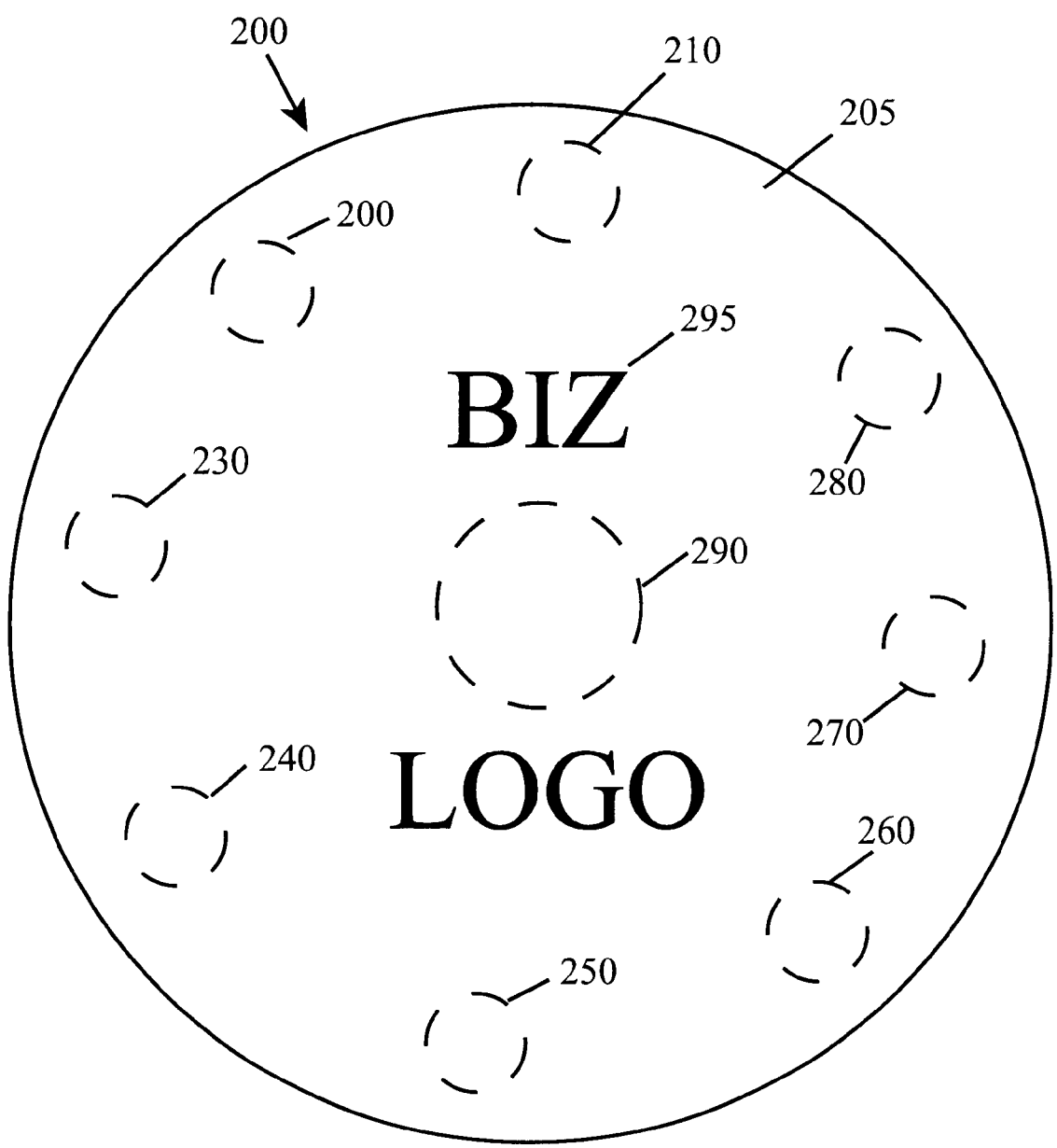
FIG. 5 is a front view of another novel wheel cover of the subject invention.

FIG. 5 shows another embodiment of the novel wheel cover invention. Here, up to eight perforated patterns 210, 220, 230, 240, 250, 260, 270 and 280 each having diameters of approximately 1 inch, can be spaced approximately ¼ to approximately 2 inches from the side edge of the disc 205, and be arranged in a ring pattern. A centrally located perforated pattern 290 can have a diameter of approximately 2 to approximately 4 inches. The user can punch out anyone of the outer edge patterns 210–280 for allowing tire valve stems to protrude therefrom. The centrally located pattern 290 can likewise be punched out to create a through-hole for a raised center hub member on a wheel. Additionally, anyone of the patterns 210–290 can be punched out in order to circulate air to heat generating components such as breaks on large vehicles, such as but not limited to buses and trucks. It is important to note that the decoration indicia such as a business name 295 can be positioned away from the perforated patterns 210–290. Thus, punching out a through-hole will not effect the advertisement that can be placed on the novel covers.

Figure 6:
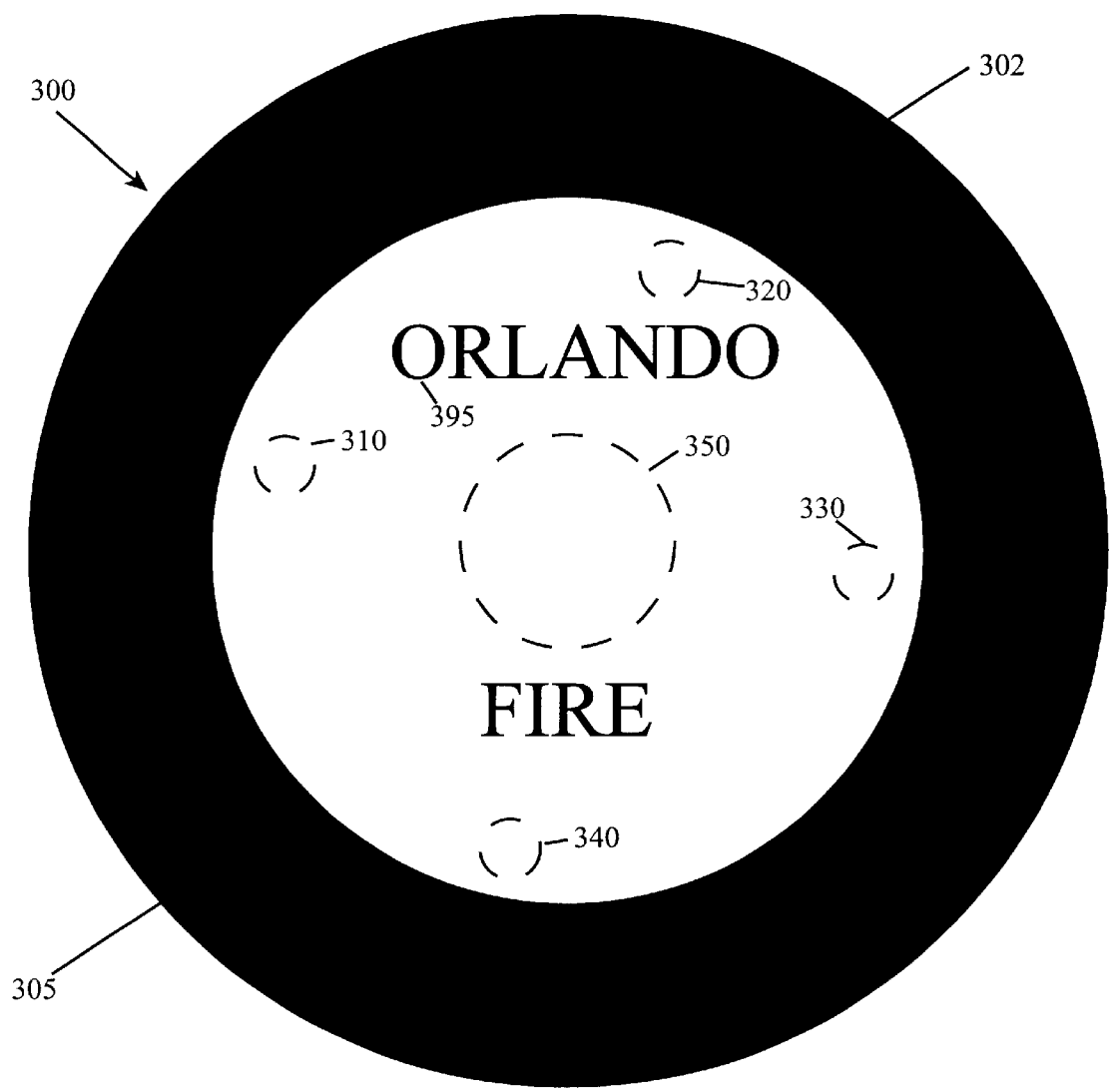
FIG. 6 is a front view of still another novel wheel cover of the subject invention.

FIG. 6 shows another embodiment of the novel wheel cover 300 mounted on a wheel 302. Disc 305 includes outer edge perforated patterns 310, 320, 330 and 340, each of which can have a diameter of approximately 1 to approximately 1 & ½ inches, and a centrally located perforated pattern 350 with the remaining dimensions similar to those described above. Indicia 395 can also be located so that punching out any of the perforated patterns will not effect the message 395 on the cover 305.

Figure 7:
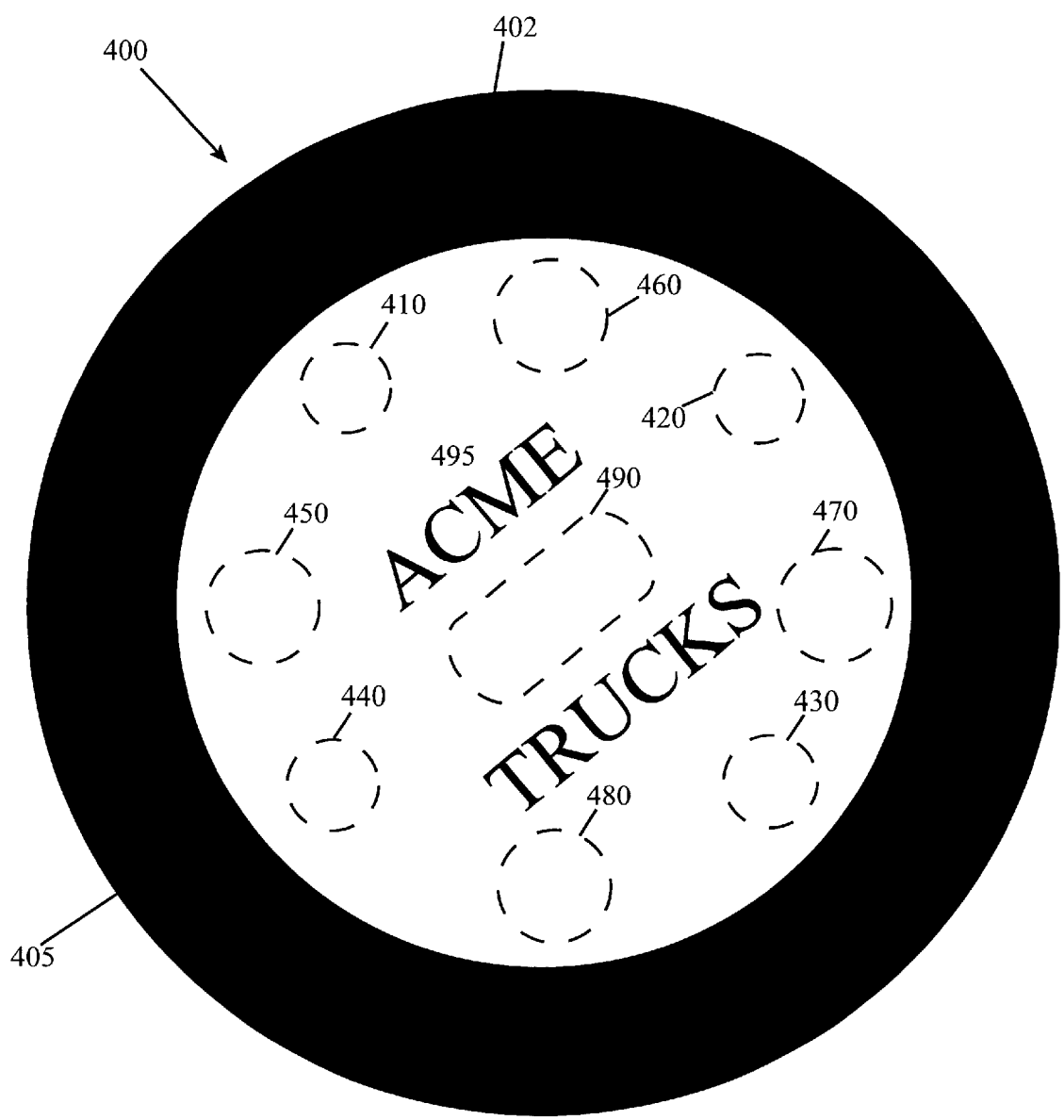
FIG. 7 is a front view of still another novel wheel cover of the subject invention.

FIG. 7 shows another embodiment 400 of the novel wheel cover invention. A disc cover 405 can be mounted on a wheel as previously described. Outer edge perforated patterns can be in a ring shape and include different diameters so that the diameters of perforated patterns 410, 420, 430, 440 are different from those of patterns 450, 460, 470, 480. For example, patterns 410–440 can have a diameter of approximately ½ inch, while patterns 450–480 can have a diameter of approximately 1 and ½ inches to handle different sized raised tire valve stems. Additionally, the central perforated pattern can be rectangular, oval, and the like, and have various sized dimensions to handle any dimensions of a raised central hub portion of the underling wheel 402.

Figure 8:
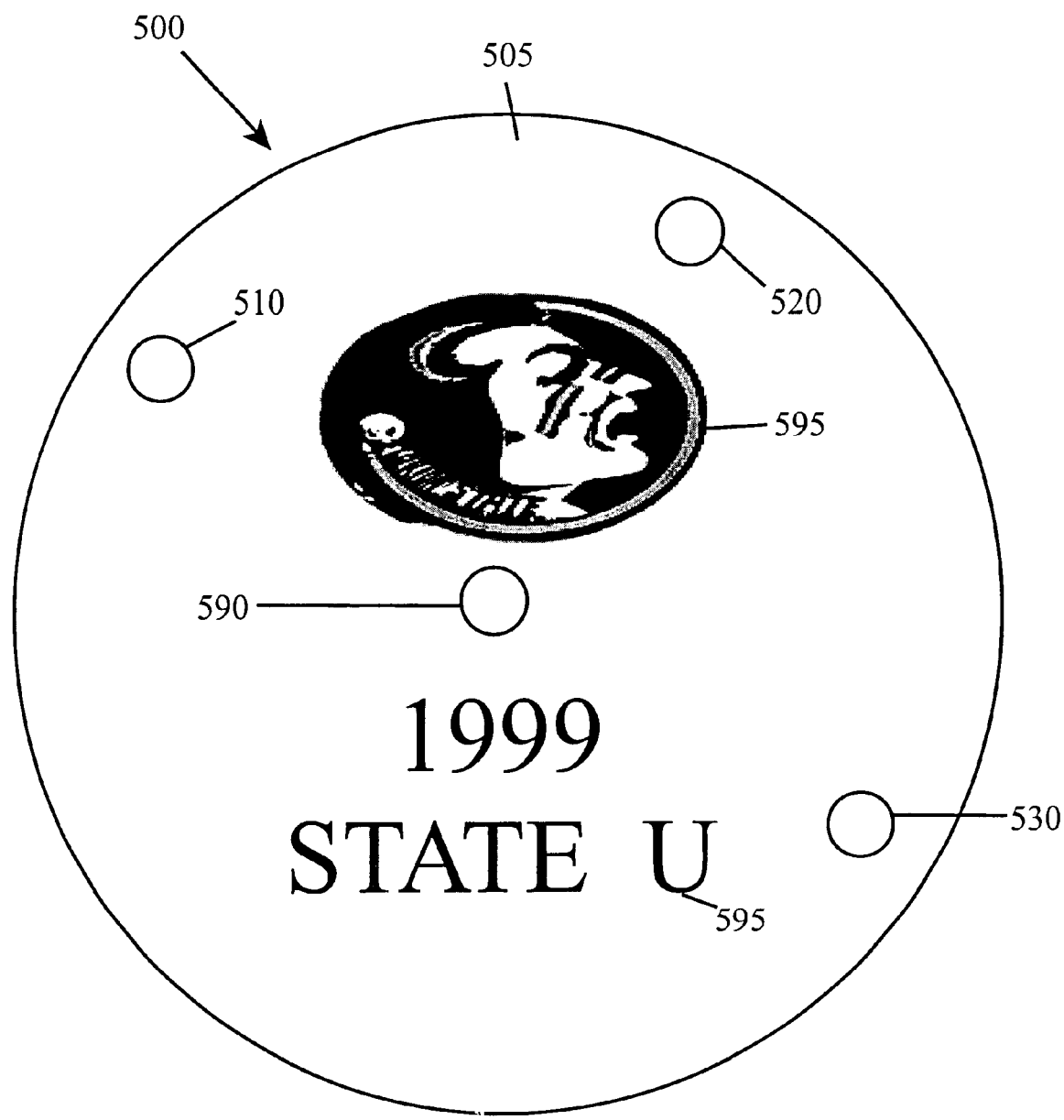
FIG. 8 is a front view of still another novel wheel cover of the subject invention.

FIG. 8 shows still another embodiment 500 of the novel wheel cover invention. Wheel cover 500 includes a disc shape 505, three outer edge perforated patterns 510, 520, 530, center perforated pattern 590, and indicia advertisement 595.

Figure 9A:
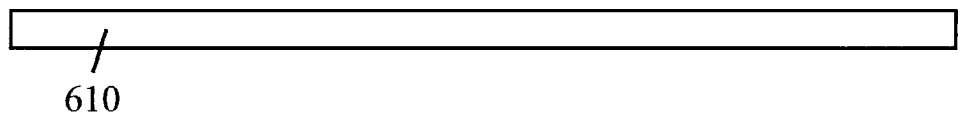
FIG. 9A is a side cross-sectional view of a flat wheel cover disc.

FIG. 9A is a side cross-sectional view of a flat wheel cover disc 610 that can use any of the perforated patterns previously described.

Figure 9B:
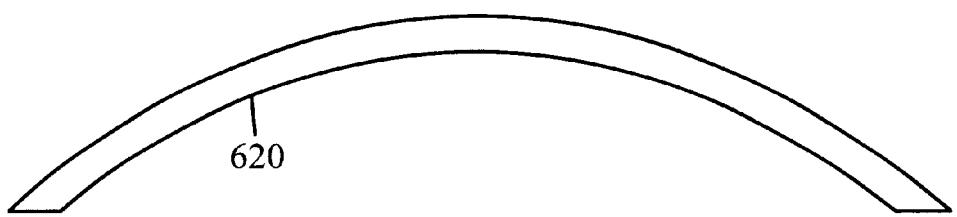
FIG. 9B is a side cross-sectional view of a domed wheel cover disc.

FIG. 9B is a side cross-sectional view of a domed wheel cover disc 620 that can use any of the perforated patterns previously described.

Figure 9C:
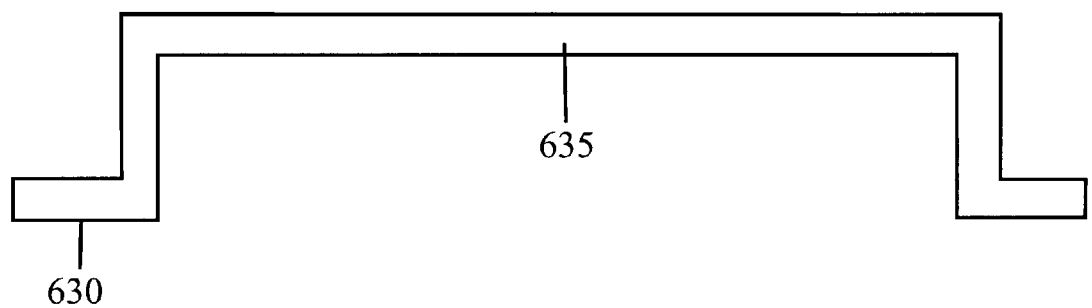
FIG. 9C side cross-sectional view of a hat-shaped wheel cover disc.

FIG. 9C is a side cross-sectional view of a hat-shaped wheel cover disc 630, 635 that can use any of the perforated patterns previously described. Vehicle wheels having raised components can be selectively covered by the dome and hat shapes.

The indicia type design on the external side of the wheel cover is not intended to cross over the closed line of perforation patterns. Thus, if the user punches out any of the perforated openings, the design(s) on the disc cover is not effected. The designs can be chosen from optical illusions such as a spiral design, such as the one described in U.S. Pat. No. 5,931,543 to Smith, which is incorporated by reference. Additionally, the design can be a business identifier, sports team identifier, educational school identifier, wherein the identifiers can be a name, a logo, a design, combinations thereof, and the like.

While the discs are preferably formed from plastic, the discs can be made from other durable type materials having waterproof and weather resistant exterior surfaces.

Although, dimensions for the diameter of the disc were described previously, the novel disc cover can be sized for larger applications such as for large wheels on multi-wheeler tractor trailers, trucks, buses, and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

I claim:

1. A removable decorative wheel cover for covering wheel hubs on moving vehicles, comprising in combination:

a wheel on a vehicle, the wheel having a valve stem and a wheel hub;

a thin rigid and pliable disc for substantially covering the wheel hub of the vehicle, the disc having a diameter of approximately 13 inches to approximately 36 inches, the disc having a thickness of approximately 1/32 of an inch to approximately 1/2 of an inch;

at least one perforated pattern through the disc for allowing a user to remove at least one small portion of material from the disc to form at least one through-hole therein, wherein the at least one through-hole can be selectively created by the user of the disc for allowing at least one of: a raised portion of the valve stem of the wheel, and a raised portion of the wheel hub of the wheel to protrude therethrough;

a fastener for allowing the disc to be removably attached to the wheel hub and for keeping the disc on the wheel hub while the vehicle is moving; and indicia on an external portion of the disc, the indicia not overlapping into the perforated pattern.

2. The removable decorative wheel cover of claim 1, wherein perforated pattern includes:

a substantially rectangular shape.

3. The removable decorative wheel cover of claim 1, wherein the perforated pattern includes:

a substantially circular shape.

4. The removable decorative wheel cover of claim 1, wherein the perforated pattern includes:

a shape that is neither rectangular nor circular.

5. The removable decorative wheel cover of claim 1, wherein the at least one perforated pattern, includes:

a ring of individual perforated patterns adjacent to an outer perimeter of the disc.

6. The removable decorative wheel cover of claim 5, wherein the ring of individual perforated patterns are approximately 1/4 of an inch to approximately 2 inches from the perimeter of the disc.

7. The removable decorative wheel cover of claim 5, wherein the ring includes:

approximately 3 to approximately 8 individual perforated patterns.

8. The removable decorative wheel cover of claim 7, wherein the approximately 3 to approximately 6 individual perforated patterns have individual diameters of approximately 1 to approximately 1 & 1/2 inches.

9. The removable decorative wheel cover of claim 7, wherein each of the approximately 7 to approximately 8 individual perforated patterns have individual diameters of approximately 1/2 to approximately 1 inches.

10. The removable decorative wheel cover of claim 7, wherein the approximately 4 to approximately 8 individual perforated patterns include at least two different diameters.

11. The removable decorative wheel cover of claim 5, further comprising:

a substantially central located perforated pattern within the ring.

12. The removable decorative wheel cover of claim 11, wherein the central located perforated pattern includes: a diameter of approximately 2 to approximately 4 inches.

13. The removable decorative wheel cover of claim 1, wherein the perforated pattern includes:

a substantially central located perforated pattern in the disc.

14. The removable decorative wheel cover of claim 13, the central located perforated pattern includes: a diameter of approximately 2 to approximately 4 inches.

15. The removable decorative wheel cover of claim 1, wherein the fastener includes:

hook and loop fasteners.

16. The removable decorative wheel cover of claim 1, wherein the fastener includes:

peel and stick tape.

17. A removable decorative wheel cover for covering wheel hubs on moving vehicles, comprising:

a thin rigid and pliable cover for substantially covering an existing wheel hub of a vehicle, the cover having a diameter of approximately 13 inches to approximately 36 inches;

a perforated pattern through the cover, the perforated pattern for allowing a user to remove at least one small portion of material from the cover to form a through-hole therein, wherein the through-hole can be selectively created by the user of the cover for allowing a raised portion of the existing wheel hub to protrude therethrough; and a fastener for allowing the cover to be removably attached to the existing wheel hub and for keeping the cover on the existing wheel hub while the vehicle is moving.

18. A removable decorative wheel cover for covering wheel hubs on moving vehicles, comprising in combination:

a wheel on a vehicle, the wheel having a raised valve stem;

a thin rigid and pliable disc for substantially covering the wheel hub of the vehicle, the disc having a diameter of approximately 13 inches to approximately 36 inches, the disc having a thickness of approximately 1/32 of an inch to approximately 1/2 of an inch;

at least two separate individual perforated patterns located adjacent to an outer perimeter of the disc, each of the individual perforated patterns for allowing a user to remove at least one small portion of material from at least one of the two separate perforated patterns of the disc to form at least one through-hole therein, wherein the at least one through-hole can be selectively created by the user of the disc from one of the at least two separate individual perforated patterns for allowing a raised portion of the valve stem of the wheel to protrude therethrough; and a fastener for allowing the disc to be removably attached to the wheel hub and for keeping the disc on the wheel hub while the vehicle is moving.

19. The removable decorative wheel cover of claim 18, wherein the perforated patterns include:

a ring of individual perforated patterns adjacent to an outer perimeter of the disc.

20. The removable decorative wheel cover of claim 18, wherein the perforated patterns include:

at least approximately three to approximately 8 perforated patterns.

21. The removable decorative wheel cover of claim 18, wherein the perforated patterns include:

at least approximately three to approximately 8 perforated patterns.

* * * * *